United States Patent Office

2,899,312
Patented Aug. 11, 1959

2,899,312

METHOD OF TREATING EGG ALBUMEN

John H. Silliker, Park Forest, and Floyd L. Kauffman, Palos Park, Ill., and John L. Ohlson, South Braintree, Mass., assignors to Swift & Company, Chicago, Ill., a corporation of Illinois No Drawing. Application July 10, 1956
Serial No. 596,837

4 Claims. (Cl. 99—113)

The present invention relates in general to a method of improving the whipping properties of egg albumen. More particularly, this invention relates to a method whereby an improved egg albumen may be produced that may be used in cakes, meringues and icings and to the product resulting therefrom.

Uniformly high quality of egg albumen is difficult to maintain with the result that the whipping properties are sometimes less than adequate. Attempts have been made to improve whipping properties by adjusting the pH of the egg material and then drying, by reducing the moisture content of the dried material to less than 1% and, by simply admixing certain surface active agents with the egg whites. The latter course of action is one of the simplest but has not been adopted generally in the trade because of the absence of a thoroughly effective and non-toxic additive.

It is therefore an object of this invention to provide a method of improving the performance of egg albumen by the simple expedient of adding thereto small amounts of a non-toxic chemical substance.

It is a further object of this invention to provide a method for the preparation of egg albumen of improved functional properties as evidenced by short whipping time, low foam gravities, increased cake heights (or volumes) and improved cake textures.

A further object is to provide an improved method for whipping and using egg white, particularly in connection with preparation of products such as angel food cake.

Further objects and advantages of this invention, if not specifically set out, will become apparent during the course of the following detailed description.

This invention is the result of the discovery that the functional properties of egg albumen may be substantially improved by the addition thereto of small amounts of certain materials which are themselves constituents of many natural food products. These additives are the alkali metal salts of capric acid. Particularly effective are sodium and potassium caprate. The other alkali metal salts, including lithium, rubidium and cesium caprates are also effective, but for self-evident economic reasons are not recommended. The salts are added to egg whites in an amount between about 0.18 and 0.72 percent by weight based upon the solids content of the egg whites. The mixture is whipped according to conventional practice. While the objects sought are realized to a greater or lesser extent under varying conditions of acidity during the whipping operation, greatest improvement is observed only when the pH is carefully controlled. That is, if the caprate is added at any pH which would ordinarily prevail in fresh egg white, some improvement in whipping speed, foam gravity, cake texture and cake size will probably be noted. However, optimum results are achieved only where the pH of the albumen during the whipping stage is maintained within the range 6–7.5.

More particularly, it has been found that surface activity per se in a chemical compound is not necessarily indicative of an ability to improve the functional properties of egg material. This ability seems to be limited to specific compounds and bears little relation to the degree of surface activity displayed. Many of the surface active agents which have found utility as egg white additives heretofore, beneficially affect only a limited number of the functional properties of egg white while adversely affecting others, especially the specific gravity of the whipped foam.

The alkali metal caprates, particularly sodium and potassium caprate, decrease the egg white foam specific gravity as well as increasing cake volume, thereby improving cake appearance and texture.

There are a variety of methods of incorporating the capric acid salts in the egg white. In all events, pains should be taken to assure an even distribution throughout the entirety of the egg material. The egg white may be first desugared and dried in the conventional fashion. Alternately, the albumen used may be a liquid. Preferably, the caprate, in a dry condition, is next added to a small amount of the egg albumen and this mixture in turn admixed with a large batch of egg material. Of course, the caprate may also be directly admixed with the entire albumen batch. Suitable apparatus may be used to secure proper dispersion of the caprate throughout the larger body of egg material such as a colloid mill or other stirring or mixing device. After dispersion is complete, the albumen may be whipped (after reconstitution if the product is dried).

The preferred amount of capric acid salt additive falls between 0.18 and 0.72 percent by weight calculated on the basis of the egg white solids.

As is indicated above, one approach is to add the capric acid salt to dried egg material. It is also possible to add the agents of this invention to the egg white prior to drying, or the caprates may be mixed with egg material to form a liquid emulsion, which may itself be used immediately or which may be frozen and maintained in this condition below the minimum temperatures of decomposition until needed.

As was indicated at the outset, the pH of the admixture which prevails at the time the whipping operation takes place is of considerable significance in determining the extent to which the functional properties of the egg albumen will be modified. The natural pH of fresh or reconstituted dried egg white will enable satisfactory results, but not necessarily the finest. Preferably, a pH of 6.0 to 7.5 should prevail during the whipping stage. A pH of 6.5 is considered optimum since at this point, provided proper amounts of caprate are employed, the whipping time will be shortest and the cake height greatest. Materials for adjusting the pH are cream of tartar, citric acid, monocalcium phosphate, sodium bicarbonate and the like.

The type cake to which reference has been made elsewhere is cake of the angel food variety. Angel food cake is improved with respect to its grain texture, "chewability," and volume as well as in its general outer appearance when egg material treated in accordance with the teachings of this invention is used as an ingredient in the cake batter. Other batter ingredients in angel food cakes are flour, sugar, acidifying agents such as cream of tartar or the like, and flavoring materials. This type of recipe, being devoid of shortening, is particularly suitable for use with the treated egg whites. However, caprate treated egg whites may also be employed where it is possible to take advantage of their volume producing, emulsifying and colloidal properties, as in meringues and icings.

Examples are set forth below showing the preparation of the egg material of this invention and showing its use in a typical angel food cake formula and the results observed. It should be borne in mind that the examples are solely for illustrative purposes and are not to be construed as imposing limitations on the scope of the invention other than as are set out in the appended claims.

EXAMPLE I

About 0.07 gram of sodium caprate were admixed in crystalline form with 39 grams fluff-dried egg white and thoroughly comingled in a colloid mill. Next, 3.5 grams cream of tartar were added to the mixture together with 300 grams of water. The pH at this point was 7.5. Whipping was begun and after a period of 2½ minutes a whip filling the bowl and capable of forming "stiff peaks" was obtained. The foam specific gravity was found to be .110.

By way of contrast, when identical procedures were followed but no caprate added, a period of 2¾ minutes was required to form an acceptable foam. The foam gravity was greater, .135.

Much more striking was the comparison of the effect on the cakes made from batter incorporating the different types of egg whites, caprate treated and untreated. Both were tested in the following angel food cake formula:

|  | Grams |
|---|---|
| Egg whites (dried) | 39 |
| Water | 300 |
| Granulated sugar | 300 |
| Cake flour | 70 |
| Salt | 1 |
| Vanilla | 2 |

The caprate treated egg whites produced a cake of good grain, texture and general appearance. Where the caprate was omitted the cake obtained had an inferior texture. The table below shows how results obtained in the above two tests compared with others conducted under similar conditions excepting pH, which was varied between 7.5 and 5.0. In each additional test 0.07 gram sodium caprate per 39 grams albumen was used.

Table A

| Condition of Egg White | pH | Whipping Time, min. | Foam Sp. Gravity | Cake Height, mm. | Texture |
|---|---|---|---|---|---|
| No caprate added | 7.5 | 2¾ | 0.135 | 110 | Very poor. |
| Caprate added | 7.5 | 2½ | 0.110 | 105 | Good. |
| Do | 6.8 | 2¼ | 0.115 | 116 | Very good. |
| Do | 6.5 | 2 | 0.120 | 118 | Excellent. |
| Do | 6.0 | 2¼ | 0.115 | 115 | Fair. |
| Do | 5.5 | 2¼ | 0.110 | 118 | Poor. |
| Do | 5.0 | 2½ | 0.110 | 112 | Do. |

As can be easily seen from the above, the optimum pH for caprate activity is about 6.5.

EXAMPLE II

Further tests were conducted to determine the effect of varying the amount of sodium caprate which was added to the fluff-dried egg white. In each of these tests using sodium caprate, the additive was admixed with 39 grams dried egg albumen. To this mixture was added 300 grams water and the pH adjusted to the optimum as determined by the prior tests (pH 6.5). Cream of tartar served as the acidifying agent. The whipping time for the controls (without sodium caprate) was 3¼ minutes and where the additive was used, 2¼ minutes. The cake formula used was the same as in Example I.

Table B below clearly shows that the preferred amount of sodium caprate additive falls between 0.18 and 0.72 percent by weight calculated on the basis of egg white solids and the consistent superiority of caprate treated egg white.

Table B

| Sodium Caprate Added | | Cake Height, mm. | Foam, Sp. Gr. |
|---|---|---|---|
| Percent | Grams | | |
| None | | 112 | .160 |
| 0.09 | 0.035 | 114 | .150 |
| .18 | 0.07 | 117 | .135 |
| .36 | 0.14 | 116 | .140 |
| .72 | 0.28 | 114 | .135 |
| 1.12 | 0.43 | 108 | .135 |

EXAMPLE III

Further tests were conducted to accurately define the effect of a caprate on the whipping properties of egg white and the improvement to be expected in the angel food cake formula (Example I). In each of the tests reported immediately below using sodium caprate, about 0.7 gram of the additive was mixed with 39 grams dried egg albumen (.18% sodium caprate based on the dried egg solids weight). To this mixture was added 300 grams water and the pH adjusted to the optimum as determined by the prior tests (pH 6.5). Cream of tartar served as the acidifying agent. The whipping time for the controls (without sodium caprate) was 3½ minutes and where the additive was used, 2½ minutes. A total of ten cakes were then prepared to show the effectiveness of five batches of untreated egg white and five containing the caprate.

The table below clearly shows the consistent superiority of caprate treated egg white.

Table C

| Cake Volume, ml. | | Cake Height, mm. | | Foam, Sp. Gr. | |
|---|---|---|---|---|---|
| Control | Additive | Control | Additive | Control | Additive |
| 4,285 | 4,375 | 112 | 116 | .155 | .145 |
| 4,385 | 4,455 | 113 | 115 | .150 | .135 |
| 4,365 | 4,535 | 113 | 119 | .160 | .135 |
| 4,215 | 4,495 | 110 | 117 | .160 | .135 |
| 4,265 | 4,385 | 111 | 116 | .155 | .140 |
| [1] 4,303 | [1] 4,449 | [1] 111.8 | [1] 116.6 | [1] .156 | [1] .140 |

[1] Average.

Additional tests were conducted in fashion similar to those described above using fluff dried egg white containing .18% potassium caprate. A pH of 6.5 was used. Once again, the superiority of caprate treated egg white was evident.

Table D

| Cake Volume | | Foam, Sp. Gr. | |
|---|---|---|---|
| Control | Additive | Control | Additive |
| 112 | 117 | .160 | .140 |
| 114 | 117 | .155 | .135 |
| 115 | 119 | .155 | .140 |
| 116 | 120 | .160 | .145 |

EXAMPLE IV

Still further tests were conducted to determine whether the caprates are equally effective where the egg albumen used is fresh or of the defrosted frozen variety. The following angel food cake formula was used:

|  | Grams |
|---|---|
| Egg whites | 320 |
| Water | 20 |
| Granulated sugar | 300 |
| Cake flour | 70 |
| Salt | 1 |
| Vanilla | 2 |

The agent was in each case mixed with the egg white and the water added. Next the other ingredients were admixed. Cream of tartar served as the acidifying agent and the optimum pH, 6.5 was used in each test. Results were as follows:

Table E
FRESH EGG ALBUMEN

| Sodium caprate added, percent (egg white solids wt. basis) | Cake Height, mm. | Foam, Sp. Gr. |
|---|---|---|
| None | 114 | .165 |
| 0.09 | 114 | .150 |
| 0.18 | 118 | .145 |
| 0.36 | 117 | .135 |
| 0.72 | 115 | .130 |
| 1.12 | 109 | .135 |

Table F
FRESH EGG ALBUMEN

| Potassium caprate added, percent (egg white solids wt. basis) | Cake Height, mm. | Foam, Sp. Gr. |
|---|---|---|
| None | 114 | .165 |
| 0.09 | 114 | .155 |
| 0.18 | 116 | .145 |
| 0.36 | 117 | .140 |
| 0.72 | 116 | .140 |
| 1.12 | 110 | .145 |

Table G
FROZEN DEFROSTED EGG ALBUMEN

| Potassium caprate added, percent | Cake Height, mm. | Specific Gravity |
|---|---|---|
| None | 113 | .160 |
| 0.09 | 114 | .150 |
| 0.18 | 118 | .140 |
| 0.36 | 117 | .135 |
| 0.72 | 113 | .140 |
| 1.12 | 106 | .135 |

Table H
FROZEN DEFROSTED EGG ALBUMEN

| Sodium caprate added, percent | Cake Height, mm. | Specific Gravity |
|---|---|---|
| None | 113 | .160 |
| 0.09 | 113 | .155 |
| 0.18 | 117 | .145 |
| 0.36 | 117 | .135 |
| 0.72 | 114 | .130 |
| 1.12 | 107 | .135 |

As is evident from the foregoing, about 0.18 to about 0.72% caprate based on the egg solids weight is an optimum for all varieties of egg albumen, whether fresh, frozen and defrosted or dried. On either side of the range given, the effect of the caprate is encountered but to a decreasingly manifest extent. Thus it is to be emphasized that 0.18 to 0.72% does not represent an absolute statement of limits of operability.

As was stated above, the egg whites used may be either liquid or dried. They may also contain any of the other known modifying agents such as sugars, sodium chloride, acids such as tartaric acid and acetic acid, hexahydric alcohols such as mannitol and sorbitol or any of the various hydrophilic colloids as, for example, the vegetable gums.

Obviously many modifications and variations of the invention as hereinbefore set forth may be made without departing from the spirit and scope thereof, and therefore only such limitations should be imposed as are indicated in the appended claims.

We claim:
1. The method of improving the whipping properties of egg albumen which comprises adding to the egg albumem at least about 0.09 and less than 1.12% of an alkali metal salt of capric acid based on the weight of the egg albumin solids to improve substantially said whipping properties of the egg albumen and adjusting the pH of the resulting mixture to between about 6.0 and 7.5.

2. The method of claim 1 wherein the amount of alkali metal salt of capric acid is between about 0.18 and 0.72 percent based on the weight of the egg albumen solids.

3. The method of whipping egg albumin which comprises adding to the albumin between about 0.18 and 0.72% of an alkali metal salt of capric acid based on the weight of the egg albumin solids, whipping the eggs and maintaining the pH of the albumin between about 6 and 7.5 during said whipping.

4. A product prepared in accordance with the method of claim 1.

References Cited in the file of this patent
UNITED STATES PATENTS 2,183,516    Mink _____ Dec. 12, 1939

FOREIGN PATENTS 488,862    Great Britain _____ July 6, 1938

OTHER REFERENCES

Surface Active Agents, 1949, by A. M. Schwartz et al., published by Interscience Publishers, Inc., New York, page 25.